(12) United States Patent
Nielsen et al.

(10) Patent No.: US 12,291,323 B2
(45) Date of Patent: May 6, 2025

(54) LEADING EDGE STRUCTURE FOR A FLOW CONTROL SYSTEM OF AN AIRCRAFT

(71) Applicant: AIRBUS OPERATIONS GMBH, Hamburg (DE)

(72) Inventors: Frank Nielsen, Hamburg (DE); Martin Obermaier, Hamburg (DE); Michael Höft, Hamburg (DE); Ivano Bertolini, Hamburg (DE); Jeff Wee Hong Yap, Hamburg (DE); Sergej Rajkowski, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 268 days.

(21) Appl. No.: 17/796,461

(22) PCT Filed: Jan. 27, 2021

(86) PCT No.: PCT/EP2021/051862
§ 371 (c)(1),
(2) Date: Jul. 29, 2022

(87) PCT Pub. No.: WO2021/151945
PCT Pub. Date: Aug. 5, 2021

(65) Prior Publication Data
US 2023/0294819 A1 Sep. 21, 2023

(30) Foreign Application Priority Data
Jan. 30, 2020 (DE) ................ 10 2020 102 325.1

(51) Int. Cl.
*B64C 21/04* (2023.01)
*B64C 3/50* (2006.01)
(Continued)

(52) U.S. Cl.
CPC ............. *B64C 21/04* (2013.01); *B64C 3/50* (2013.01); *B64C 21/06* (2013.01); *B64C 21/08* (2013.01); *B64C 2003/146* (2013.01)

(58) Field of Classification Search
CPC .......... B64C 21/04; B64C 3/50; B64C 21/06; B64C 21/08; B64C 2003/146; Y02T 50/10
See application file for complete search history.

(56) References Cited

U.S. PATENT DOCUMENTS 3,128,966 A * 4/1964 Alvarez-Calderon ....................... B64C 21/02
244/210
3,454,239 A * 7/1969 Frey ...................... B64C 23/005
244/208

(Continued)

FOREIGN PATENT DOCUMENTS

| EP | 2 853 485 | 4/2015 | |
| EP | 3 428 062 | 1/2019 | |
| WO | WO-2009023354 A2 * | 2/2009 | ............. B64C 21/06 |

OTHER PUBLICATIONS

International Search Report for PCT/EP2021/051862, dated Apr. 14, 2021 (3 pages).
(Continued)

*Primary Examiner* — Assres H Woldemaryam
(74) *Attorney, Agent, or Firm* — Nixon & Vanderhye P.C.

(57) ABSTRACT

A leading edge structure (11) for a flow control system of an aircraft (1), including a leading edge panel (13) surrounding a plenum (17) and having a first side portion (21), a second side portion (27), an inner surface (33) facing the plenum (17) and an outer surface (37) in contact with an ambient flow (39), wherein the leading edge panel (13) includes micro pores (45), wherein a first port device (49) is arranged in the first side portion (21) fluidly connected to the plenum (17) via a duct (53) defined by a duct structure (105), and
(Continued)

wherein the first port device (49) comprises a first door (55) pivotable by a first hinge (57) about a first hinge axis (59).

15 Claims, 5 Drawing Sheets

(51) Int. Cl.
 *B64C 21/06* (2023.01)
 *B64C 21/08* (2023.01)
 *B64C 3/14* (2006.01)

(56) References Cited

U.S. PATENT DOCUMENTS

| | | | | |
|---|---|---|---|---|
| 3,921,942 | A * | 11/1975 | Bracka | B64C 21/025 244/87 |
| 4,418,879 | A * | 12/1983 | Vanderleest | B64D 33/02 137/15.1 |
| 6,349,899 | B1 * | 2/2002 | Ralston | B64D 33/02 244/53 B |
| 8,245,976 | B2 * | 8/2012 | Sakurai | B64C 21/02 244/58 |
| 11,155,342 | B2 * | 10/2021 | Büscher | B64C 5/06 |
| 2010/0181435 | A1 * | 7/2010 | Sakurai | B64C 21/08 244/209 |
| 2014/0021304 | A1 * | 1/2014 | Gerber | B64C 3/26 244/35 R |
| 2015/0083866 | A1 * | 3/2015 | Biedscheid | B64C 21/06 244/91 |

OTHER PUBLICATIONS

Written Opinion of the ISA for PCT/EP2021/051862, dated Apr. 14, 2021 (6 pages).

* cited by examiner ously; LEADING EDGE STRUCTURE FOR A FLOW
CONTROL SYSTEM OF AN AIRCRAFT

RELATED APPLICATION

This application is the U.S. national phase of International Application PCT/EP2021/051862, filed Jan. 27, 2021, which designated the U.S. and claims priority to German patent application DE 10 2020 102 325.1, filed Jan. 30, 2020, the entire contents of each of which are hereby incorporated by reference.

BACKGROUND AND SUMMARY

The present invention relates to a leading edge structure for a flow control system of an aircraft, in particular for a Hybrid Laminar Flow Control system, where air is sucked in a porous surface of a flow body in order to extend the region of laminar flow along the flow body. Further aspects of the present invention relate to a vertical tail plane (VTP) comprising such a leading edge structure, and an aircraft comprising such a leading edge structure or such a vertical tail plane. It might also be possible and preferred that the leading edge structure is part of a horizontal tail plane or of a wing for an aircraft.

The leading edge structure comprises a leading edge panel that surrounds a plenum in a curved, i.e. arcuate, manner. The plenum extends in a span direction through the leading edge structure.

When viewed in a cross section across the span direction, the leading edge panel has a first side portion extending from a leading edge point, i.e. from a fore tip of the leading edge structure, to a first attachment end on a first side of the leading edge structure, the first attachment end being configured for attachment to a further structure located downstream from the leading edge. Further, the leading edge panel has a second side portion opposite the first side portion, wherein the second side portion extends from the leading edge point to a second attachment end on a second side of the leading edge structure opposite the first side, the second attachment end being configured for attachment to a further structure downstream from the leading edge.

The leading edge panel comprises an inner surface facing the plenum and an outer surface in contact with or configured to be in contact with an ambient flow. Further, the leading edge panel comprises a plurality of micro pores, such as perforations, forming a fluid connection between the plenum and the ambient flow, so that air from the ambient flow can be sucked in through the micro pores into the plenum, and, where applicable, pressurized air from the plenum can be blown out through the micro pores into the ambient flow.

Further, a first port device is arranged in the first side portion of the leading edge panel. The first port device is configured for letting in air of the ambient airflow into the plenum and/or for discharging air from the plenum into the ambient air flow. The leading edge panel might be formed integrally or might be formed separated by two or more separate panel parts arranged next to each other in the span direction, wherein a first panel part includes the micro pores and a second panel part includes the first port device. The first port device is fluidly connected to the plenum via a duct defined and surrounded by a duct structure.

The first port device comprises a first door pivotable relative to the leading edge panel by a first hinge about a first hinge axis between at least two positions of an outlet position, a closed position, and an inlet position. I.e., the first door is pivotable between the closed position and the outlet position, between the closed position and the inlet position, or between the outlet position, the closed position, and the inlet position. In the outlet position, air from an ambient air flow is let in through the first port device into the plenum, wherein the first door preferably pivots outwards into the ambient air flow so that it extends external to an outer mold line, preferably forming a rearward facing opening. In the closed position, no air stream through the first port device is allowed and the first door is preferably flush with the outer mold line. In the inlet position, air from an ambient air flow is let out from the plenum through the first port device into the ambient air flow, wherein the first door preferably pivots inwards inside the leading edge structure so that it extends internal to the outer mold line, preferably forming a forward facing opening.

Similar leading edge structures are known in the art of hybrid laminar flow control systems. In known leading edge structures, inlet or outlet doors are moved by actuators that are arranged inside the leading edge structure but outside the duct. In other leading edge structures, actuators are arranged inside the duct.

The object of the present invention is to provide a more efficient leading edge structure enabling powerful door actuation and requiring minimum space.

This object is achieved in that the leading edge structure comprises a first actuation mechanism for actuating the first door for movement between the at least two positions of the outlet position, the closed position and the inlet position, wherein the first actuation mechanism extends through the duct structure, so that a part of the first actuation mechanism is arranged inside the duct and another part of the first actuation mechanism is arranged outside the duct.

Such a design of the leading edge structure is very space efficient and enables a powerful and reliable actuation of the first door. Additionally, flow characteristics inside the plenum can be improved and sealing of the first door relative to the leading edge panel can be simplified, compared to an arrangement where the actuation mechanism is arranged fully inside the duct.

According to a preferred embodiment, the first actuation mechanism comprises a first actuator, a first lever in the form of a torque arm, and a first shaft. Preferably, the first shaft is aligned with and rotatable about the first hinge axis, and is fixedly mounted to the first door. Further, the first lever is preferably mounted to the first shaft in a torque proof manner. The first actuator is preferably formed as a linear actuator configured to adjust the distance between its first and second ends. The first actuator is preferably pivotably mounted with its first end to the first lever via a third hinge. Further, the first actuator is preferably configured for being pivotably mounted with its second end to a front spar via a fourth hinge. In such a way, a very efficient actuation mechanism is formed that requires minimum space.

In particular, it is preferred that the first shaft is arranged in a manner that it penetrates the duct structure, so that the portion of the first shaft that is mounted to the first door is arranged inside the duct, while the portion of the first shaft that is mounted to the first lever is arranged outside the duct. This means, the first lever and the first actuator are arranged outside the duct. In such a way, a very compact arrangement of the leading edge structure is achieved where only minimum parts of the actuation mechanism are arranged inside the duct, so that flow characteristics in the duct are improved and sealing of the first door is simplified. Further, the duct structure being penetrated by the first shaft only requires minimum sealing at the penetration point due to the small cross section of the first shaft.

It is further preferred that in the duct structure a first shaft fitting is provided receiving the first shaft and sealing the duct structure relative to the first shaft where the first shaft penetrates the duct structure. Such a first shaft fitting enabled simple and reliable sealing of the first shaft relative to the duct structure.

It is also preferred that the first shaft is rotatably mounted to the leading edge panel via the first hinge. Preferably, the first hinge is formed by one or more hinge brackets fixedly mounted to the leading edge panel and rotatably supporting the first shaft. Preferably, the first hinge is arranged inside the duct, in particular the hinge brackets are mounted to the leading edge panel inside the duct. This relates to a very compact design that requires minimum sealing.

According to a preferred embodiment, a second port device is arranged in the second side portion of the leading edge panel. The second port device is fluidly connected to the plenum via the duct. The second port device comprises a second door pivotable by a second hinge about a second hinge axis between at least two positions of an outlet position, a closed position, and an inlet position. I.e., the second door is pivotable between the closed position and the outlet position, between the closed position and the inlet position, or between the outlet position, the closed position, and the inlet position. In the outlet position, air from an ambient air flow is let in through the first port device into the plenum, wherein the first door preferably pivots outwards into the ambient air flow so that it extends external to an outer mold line, preferably forming a rearward facing opening. In the closed position, no air stream through the first port device is allowed and the first door is preferably flush with the outer mold line. In the inlet position, air from an ambient air flow is let out from the plenum through the first port device into the ambient air flow, wherein the first door preferably pivots inwards inside the leading edge structure so that it extends internal to the outer mold line, preferably forming a forward facing opening. By providing the second port device in addition to the first port device more efficient flow control can be carried out by the leading edge structure as a higher rate of air flow can be taken in or led out thereby enabling a higher rate of suction or blowing of air through the micro pores. Further, a symmetric design of the leading edge panel is enabled.

In particular, it is preferred that the leading edge structure comprises a second actuation mechanism for actuating the second door for movement between the at least two positions of the outlet position, the closed position and the inlet position, wherein the second actuation mechanism extends through the duct structure, so that a part of the second actuation mechanism is arranged inside the duct and another part of the second actuation mechanism is arranged outside the duct. Similar as in case of the first actuation mechanism, such a design is very space efficient and enables a powerful and reliable actuation of the second door. Additionally, flow characteristics inside the plenum can be improved and sealing of the second door relative to the leading edge panel can be simplified, compared to an arrangement where the actuation mechanism is arranged fully inside the duct.

According to a preferred embodiment, the second actuation mechanism comprises a second actuator, a second lever in the form of a torque arm, and a second shaft. Preferably, the second shaft is aligned with and rotatable about the second hinge axis, and is fixedly mounted to the second door. Further, the second lever is preferably mounted to the second shaft in a torque proof manner. The second actuator is preferably formed as a linear actuator configured to adjust the distance between its first and second ends. The second actuator is preferably pivotably mounted with its first end to the second lever via a fifth hinge. Further, the second actuator is preferably configured for being pivotably mounted with its second end to the front spar via a sixth hinge. In such a way, a very efficient actuation mechanism is formed that requires minimum space.

In particular, it is preferred that the second shaft is arranged in a manner that it penetrates the duct structure, so that the portion of the second shaft that is mounted to the second door is arranged inside the duct, while the portion of the second shaft that is mounted to the second lever is arranged outside the duct. This means, the second lever and the second actuator are arranged outside the duct. In such a way, a very compact arrangement of the leading edge structure is achieved where only minimum parts of the second actuation mechanism are arranged inside the duct, so that flow characteristics in the duct are improved and sealing of the second door is simplified. Further, the duct structure being penetrated by the second shaft only requires minimum sealing at the penetration point due to the small cross section of the second shaft.

It is further preferred that in the duct structure a second shaft fitting is provided receiving the second shaft and sealing the duct structure relative to the second shaft where the second shaft penetrates the duct structure. Such a second shaft fitting enabled simple and reliable sealing of the second shaft relative to the duct structure.

It is also preferred that the second shaft is rotatably mounted to the leading edge panel via the second hinge. Preferably, the second hinge is formed by one or more hinge brackets fixedly mounted to the leading edge panel and rotatably supporting the second shaft. Preferably, the second hinge is arranged inside the duct, in particular the hinge brackets are mounted to the leading edge panel inside the duct. This relates to a very compact design that requires minimum sealing.

It is further preferred that the duct structure has an indentation, i.e. a cut-out, to the inside of the duct, so that two wall sections of the duct structure face towards one another. Further, the second shaft penetrates the duct structure at both wall sections, so that preferably only the portion of the second shaft that is mounted to the second lever is arranged outside the duct, while the rest of the second shaft is arranged inside the duct. Preferably, the second shaft fitting receives the second shaft and seals the duct structure relative to the second shaft at the two opposite walls where the second shaft penetrates the duct structure. In such a way, the second shaft extends outside the duct only within the indentation where the second shaft is mounted to the second lever, while on both side of the indentation the second shaft extends inside the duct. This allows that a second shaft can be mounted to the second door over most of its length. This embodiment, i.e. the indentation as described above, might also be applied in connection with the first actuation mechanism.

According to a preferred embodiment, the first lever, and thus also the first actuator, is mounted to the first shaft in the area of an outbound side, preferably an upper side, of the first door. Additionally or alternatively, it is preferred that the second lever, and thus also the second actuator, is mounted to the second shaft in the area of an inbound side, preferably a lower side, of the second door. Preferably, the duct structure is sandwiched by the first actuation mechanism and the second actuation mechanism. In such a way, a very compact arrangement of the leading edge structure is enabled.

According to another preferred embodiment, the first port device is formed as an air outlet so that the first door is movable by the first actuation mechanism only between the closed position and the outlet position. Additionally or alternatively, it is preferred that the second port device is formed as an air inlet so that the second door is movable by the second actuation mechanism only between the closed position and the inlet position. In such a way, the air inlet function and the air outlet function are separated and associated with only one of the first and second port devices, which might result in a more efficient port design for the specific function. However, it might also be preferred that one or both of the first and second port devices have both inlet and outlet functions, so that the respective first and/or second doors are movable between all three positions: the outlet position, the closed position, and the inlet position.

According to another preferred embodiment, the first hinge axis is arranged at a leading edge of the first door. Additionally or alternatively, it is preferred that the second hinge axis is arranged at a leading edge of the second door. In such a way, when the first or second door pivots inwards, a forward facing inlet opening is formed between the trailing edge of the first or second door and the outer skin beside the door, while when the first or second door pivots outwards, a rearward facing outlet opening is formed between the trailing edge of the first or second door and the outer skin beside the door. This means, by pivot movement of the first or second door about only a single hinge axis it is possible to move the respective first or second door between all possible positions, i.e. two or three of the following position: the inlet position, the closed position and the outlet position, while in the inlet position the first or second door does not project out of the outer mold line into the ambient flow.

According to another preferred embodiment, the leading edge panel comprises first and second panel parts arranged next to each other in the span direction, wherein the first panel part includes the micro pores and the second panel part includes the first and second port devices. The first and second panel parts are formed either integrally as one common part or separately as two separate parts that can be mounted together or mounted next to each other. In such a way, the micro pores and the first and second port devices do not need to be arranged at the same span level of the leading edge panel or in the same panel part, but can be arranged in subsequent parts of the leading edge panel with respect to the span direction.

A further aspect of the present invention relates to a vertical tail plane for an aircraft. The vertical tail plane comprises a vertical tail plane box including a front spar, and a leading edge structure according to any of the embodiments and design variants described herein. The vertical tail plane box has a first lateral panel with a first attachment portion and an opposite second lateral panel with a second attachment portion. First and second lateral panels are preferably mounted to the front spar. The first attachment end of the leading edge structure is attached to the first attachment portion and the second attachment end is attached to the second attachment portion, so that the first side portion of the leading edge panel forms a continuous flow surface with the first lateral panel of the vertical tail plane box and the second side portion of the leading edge panel forms a continuous flow surface with the second lateral panel of the vertical tail plane box. The features and advantages described in connection with the leading edge structure apply vis-à-vis to the vertical tail plane.

According to a preferred embodiment, the first and second panel parts are arranged at the vertical tail plane box next to each other in the span direction such that preferably the first panel part is arranged further outbound and the second panel part is arranged further inbound, i.e. closer to a root of the vertical tail plane, i.e. closer to a fuselage. In such a way, the ambient air flow passing the micro pores is independent from the ambient air flow passing the first and second port devices.

A further aspect of the present invention relates to an aircraft comprising a leading edge structure according to any of the embodiments and design variants described herein, or comprising a vertical tail plane according to any of the embodiment described herein. The features and advantages described in connection with the leading edge structure and with the vertical tail plane apply vis-à-vis to the aircraft.

SUMMARY OF DRAWINGS

A preferred embodiment of the present invention is described hereinafter in more detail by means of a drawing. The drawings shown in.

DETAILED DESCRIPTION

Figure 1:
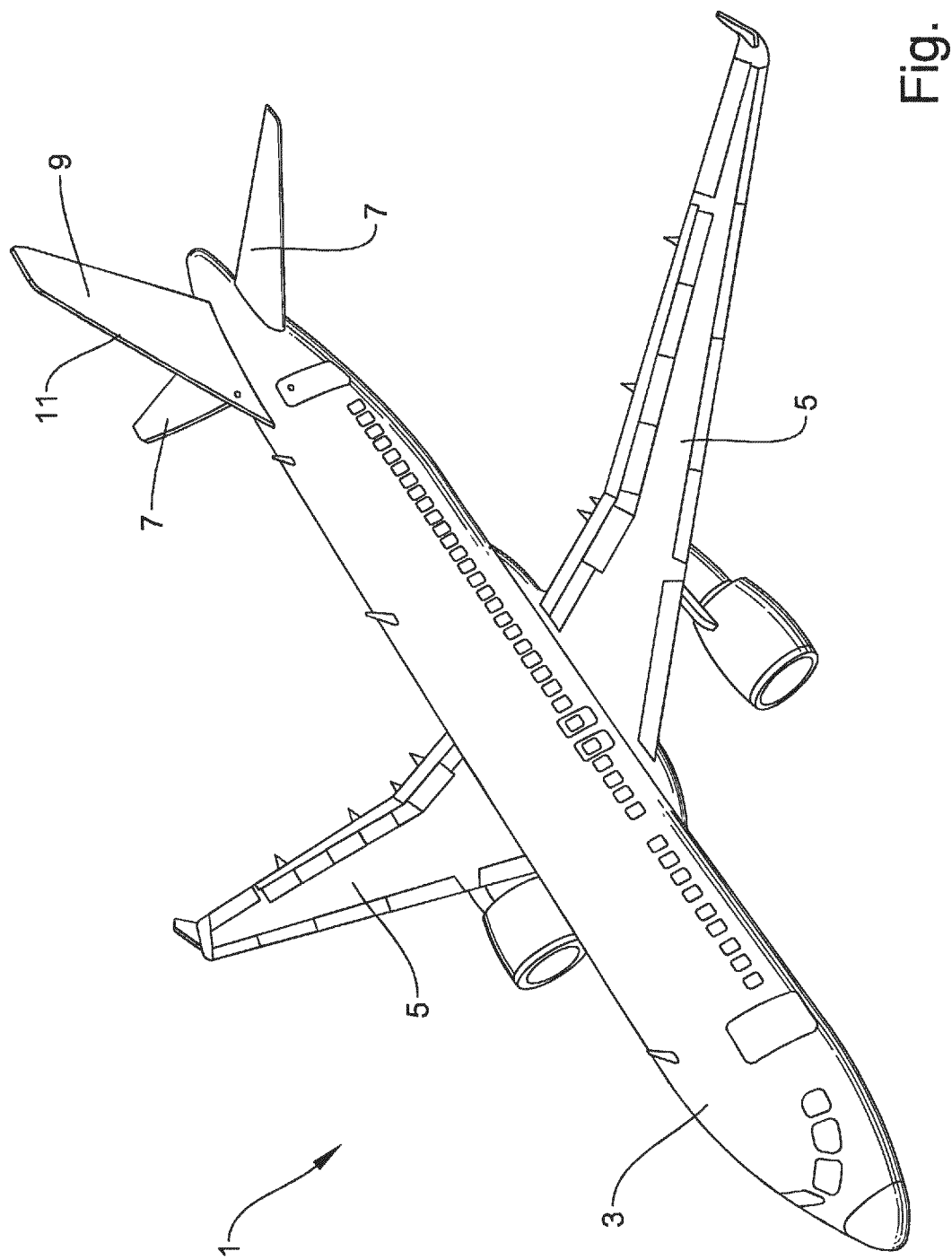
FIG. 1 a perspective view of an aircraft according to the invention.
Figure 4:
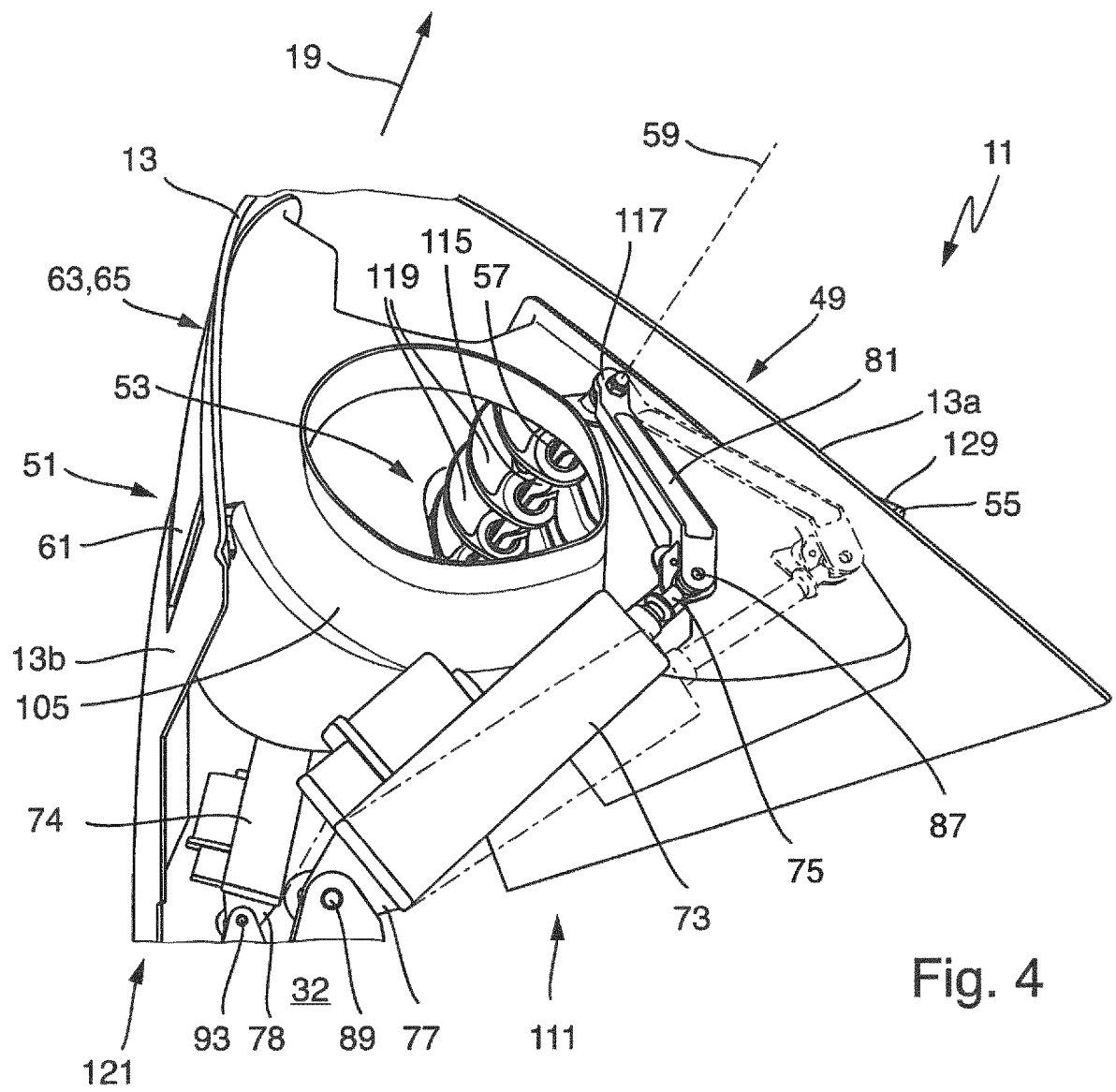
Figure 5:
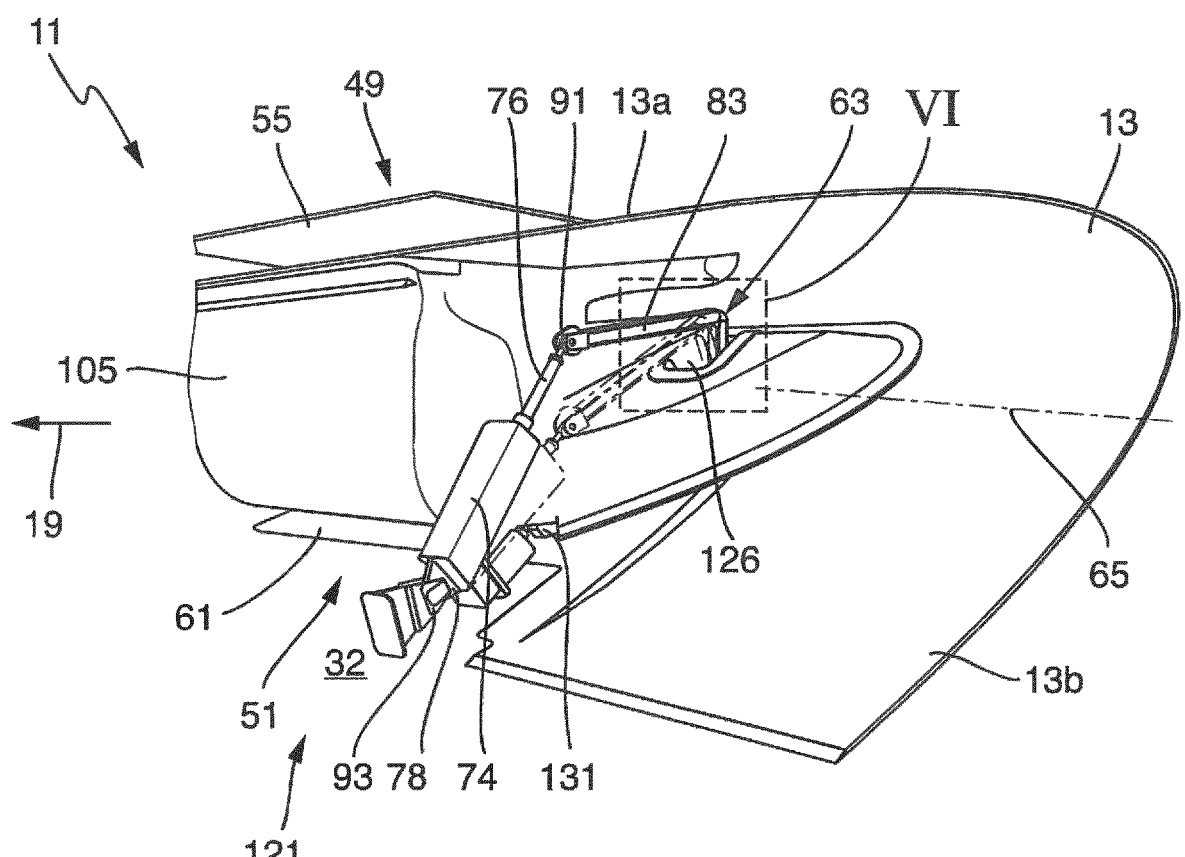
Figure 6:
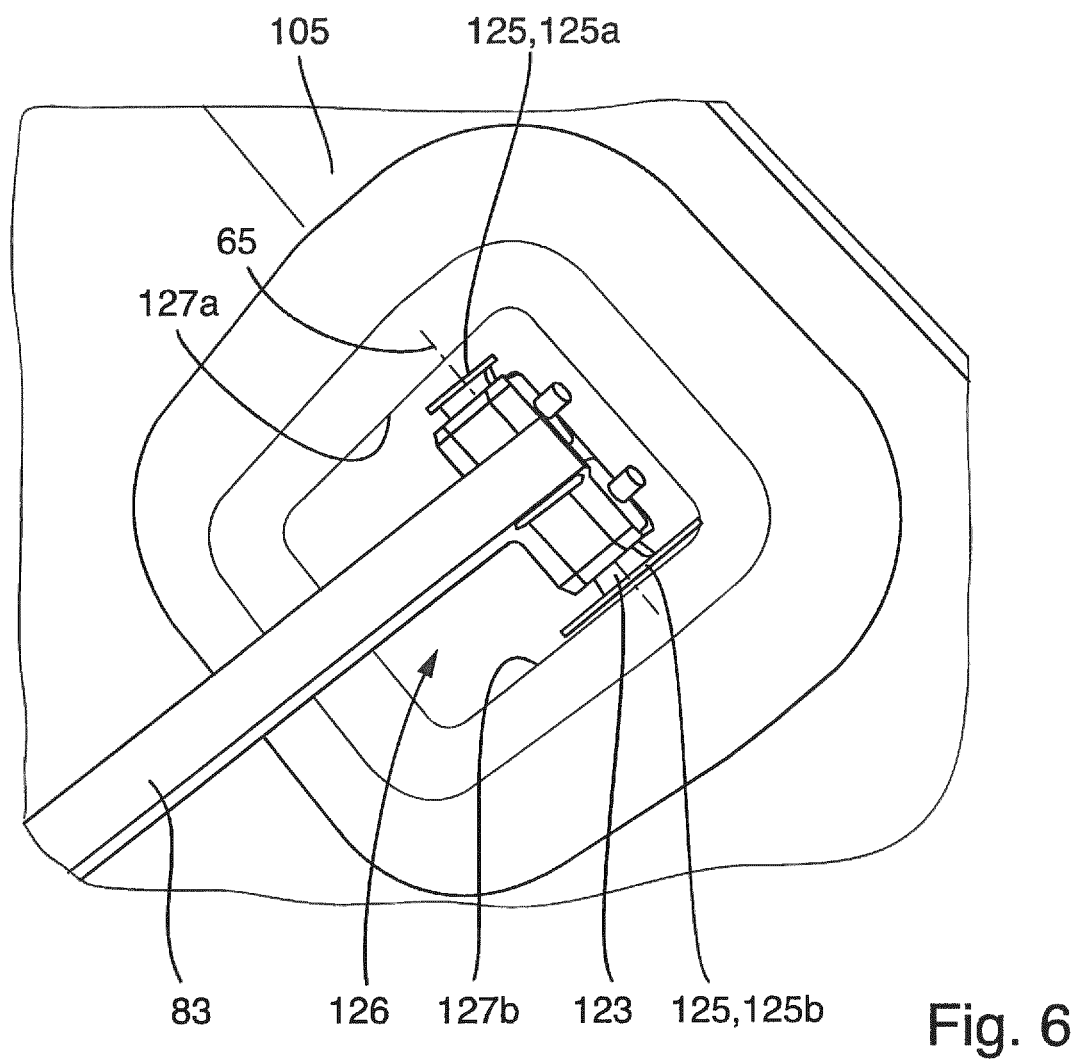

In FIG. 1 an aircraft 1 according to an embodiment of the present invention is shown. The aircraft comprises a fuselage 3, wings 5, a horizontal tail plane 7, and a vertical tail plane 9 according to an embodiment of the invention. The vertical tail plane 9 is shown in more detail in FIG. 2. The vertical tail plane 9 comprises a leading edge structure 11 according to an embodiment of the invention. An embodiment of the leading edge structure 11 is shown in more detail in FIGS. 3 to 6, wherein FIG. 3 shows a cross section at a first span level in the area of a first panel part 13a while FIGS. 4 to 6 show perspective views at a second span level in the area of a second panel part.

Figure 2:
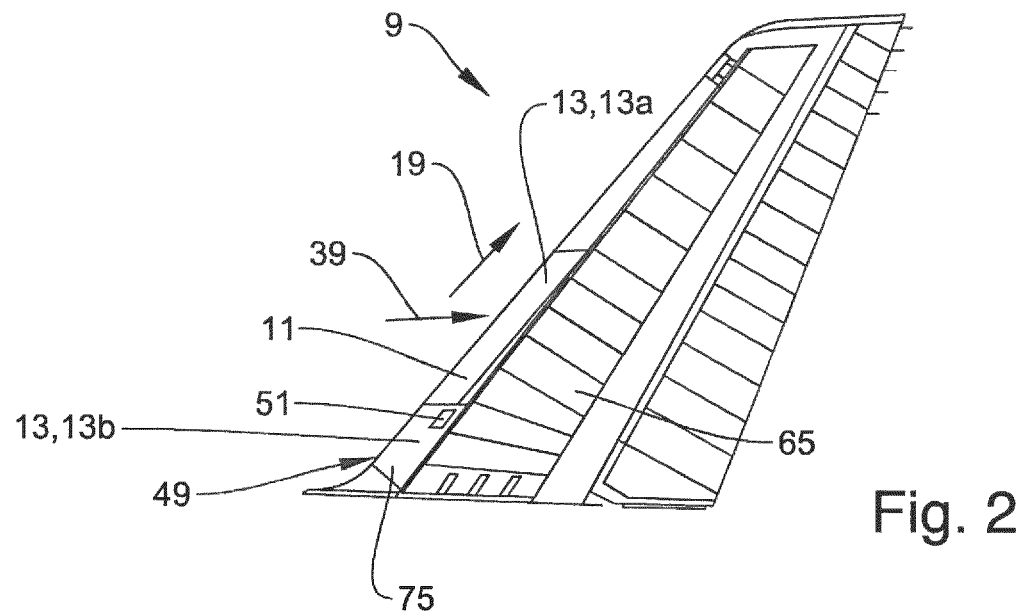
FIG. 2 a side view of a vertical tail plane according to the invention.
Figure 3:
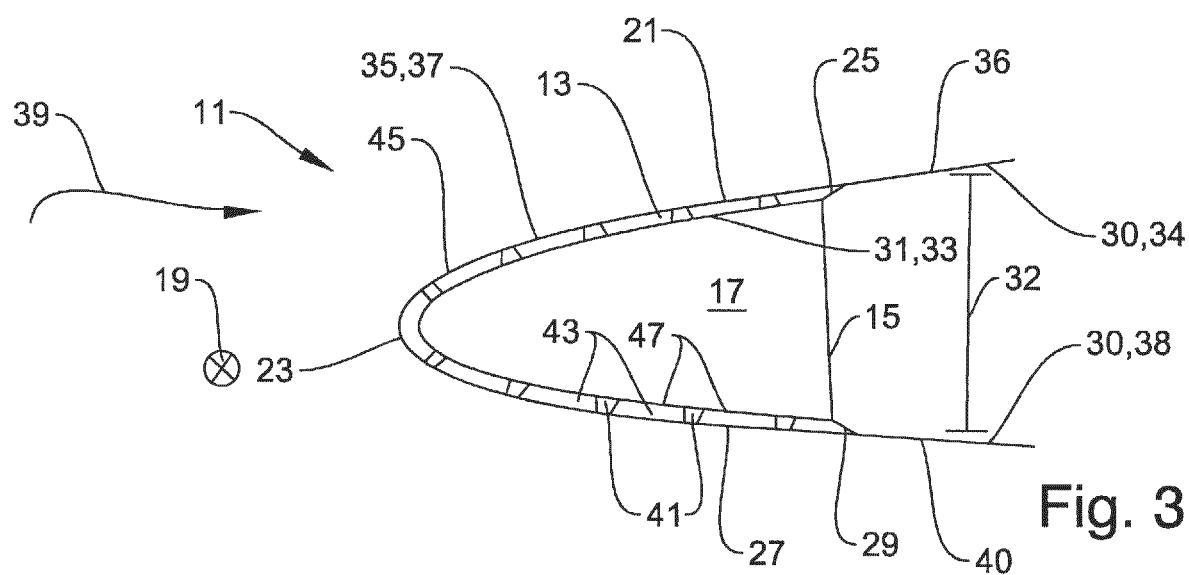
FIG. 3 a cross sectional view across the span direction in the area of a first panel part of a leading edge structure according to the invention mounted to a vertical tail plane box of the vertical tail plane shown in FIG. 2, FIG. 4 a perspective view from above in the area of the second panel part of the leading edge structure shown in FIG. 3, FIG. 5 a perspective view from below in the area of the second panel part of the leading edge structure shown in FIG. 3, and FIG. 6 a detailed view of the indentation shown in FIG. 5.

As shown in FIGS. 2 and 3, the leading edge structure 11 is configured for hybrid laminar flow control and comprises a leading edge panel 13 comprising first and second panel parts 13a, 13b, and a back wall 15. The first and second panel parts 13a, 13b are formed separately as two separate parts and are mounted to the vertical tail plane 9 next to each other in a the span direction 19, wherein the first panel part 13a is arranged further outbound and the second panel part 13b is arranged further inbound, see FIG. 2. The leading edge panel 13 surrounds a plenum 17 in a curved manner. The plenum 17 extends in the span direction 19 through the leading edge structure 11. When viewed in a cross section across the span direction 19, the leading edge panel 13 has a first side portion 21 extending from a leading edge point 23 to a first attachment end 25 on a first side of the leading edge structure 11. Further, the leading edge panel 13 has a second side portion 27 opposite the first side portion 21, wherein the second side portion 27 extends from the leading edge point 23 to a second attachment end 29 on a second side of the leading edge structure 11 opposite the first side. The back wall 15 connects the first attachment end 25 to the second attachment end 29 of the leading edge panel 13, thereby enclosing the plenum 17 on a side opposite the leading edge point 23.

As also shown in FIGS. 2 and 3, the vertical tail plane 9 comprises a vertical tail plane box 30 including a front spar 32, and the leading edge structure 11 is mounted to the vertical tail plane box 30. The vertical tail plane box 3o has a first lateral panel 34 with a first attachment portion 36 and an opposite second lateral panel 38 with a second attachment portion 40. The first attachment end 25 of the leading edge structure 11 is attached to the first attachment portion 36 and the second attachment end 29 is attached to the second attachment portion 40, so that the first side portion 21 of the leading edge panel 13 forms a continuous flow surface with the first lateral panel 34 of the vertical tail plane box 3o and the second side portion 27 of the leading edge panel 13 forms a continuous flow surface with the second lateral panel 38 of the vertical tail plane box 30.

As further shown in FIG. 3, the leading edge panel 13 has a double-walled form including an inner wall element 31 having an inner surface 33 facing the plenum 17, and an outer wall element 35 having an outer surface 37 in contact with an ambient flow 39. Between the inner and outer wall elements 31, 35 the leading edge panel 13 comprises a plurality of elongate stiffeners 41 extending in the span direction 19 and spaced apart from one another, so that between each pair of adjacent stiffeners 41 a hollow chamber 43 is formed between the inner and outer wall elements 31, 35. The stiffeners 41 are formed integrally with the inner wall element 31 in a sandwich form and have a solid, trapezoid-shaped cross section. The inner wall element 31 is formed of a fiber reinforced plastic (FRP). The outer wall element 35 is formed as a titanium sheet and comprises a plurality of micro pores 45 forming a fluid connection between the hollow chambers 43 and the ambient flow 39. The inner wall element 31 comprises openings 47 forming a fluid connection between the hollow chambers 43 and the plenum 17.

As shown in FIGS. 4 to 6, a first port device 49 is arranged in the first side portion 21 and a second port device 51 is arranged in the second side portion 27 of the leading edge panel 13. The first port device 49 is configured for discharging air from the plenum 17 into the ambient flow 39, while the second port device 51 is configured for letting in air from the ambient flow 39 into the plenum 17. The first port device 49 and the second port device 51 are fluidly connected to the plenum 17 via a duct 53 extending in the span direction 19 between the first and second panel parts 13a, 13b.

The first port device 49 comprises a first door 55 pivotable relative to the leading edge panel 13 by a first hinge 57 about a first hinge axis 59. Likewise, the second port device 51 comprises a second door 61 pivotable relative to the leading edge panel 13 by a second hinge 63 about a second hinge axis 65. The first hinge axis 59 is arranged at a leading edge of the first door 55, and the second hinge axis 65 is arranged at a leading edge of the second door 61.

The first door 55 is pivotable between, a closed position and an outlet position, while the second door 61 is pivotable between a closed position and an inlet position. In the outlet position, air from an ambient flow 39 is let in through the first port device 49 into the plenum 17, wherein the first door 55 pivots outwards into the ambient flow 39 so that it extends external to an outer mold line, forming a rearward facing opening. In the closed position, no air stream through the respective first or second port device 49, 51 is allowed and the first or second door 55, 61 is flush with the outer mold line. In the inlet position, air from an ambient flow 39 is let out from the plenum 17 through the second port device 51 into the ambient flow 39, wherein the second door 61 pivots inwards inside the leading edge structure 11 so that it extends internal to the outer mold line, forming a forward facing opening.

As shown in FIG. 4, the leading edge structure 11 comprises a first actuation mechanism in for actuating the first door 55 for movement between the closed position and the outlet position. The first actuation mechanism in extends through the duct structure 105, so that a part of the first actuation mechanism 111 is arranged inside the duct 53 and another part of the first actuation mechanism 111 is arranged outside the duct 53.

The first actuation mechanism 111 comprises a first actuator 73, a first lever 81 in the form of a torque arm, and a first shaft 115. The first shaft 115 is aligned with and rotatable about the first hinge axis 59, and is fixedly mounted to the first door 55. Further, the first lever 81 is mounted to the first shaft 115 in a torque proof manner. The first actuator 73 is formed as a linear actuator configured to adjust the distance between its first and second ends 75, 77. The first actuator 73 is pivotably mounted with its first end 75 to the first lever 81 via a third hinge 87. Further, the first actuator 73 is configured for being pivotably mounted with its second 77 end to a front spar 32 via a fourth hinge 89.

The first shaft 115 is arranged in a manner that it penetrates the duct structure 105, so that the portion of the first shaft 115 that is mounted to the first door 55 is arranged inside the duct 53, while the portion of the first shaft 115 that is mounted to the first lever 81 is arranged outside the duct 53. Further, a first shaft fitting 117 is provided in the duct structure 105, receiving the first shaft 115 and sealing the duct structure 105 relative to the first shaft 115 where the first shaft 115 penetrates the duct structure 105.

The first shaft 115 is rotatably mounted to the leading edge panel 13 via the first hinge 57. The first hinge 57 is formed by several hinge brackets 119 fixedly mounted to the leading edge panel 13 and rotatably supporting the first shaft 115. The first hinge 57 is arranged inside the duct 53 in such a way that the hinge brackets 119 are mounted to the leading edge panel 13 inside the duct 53.

As shown in FIGS. 5 and 6, the leading edge structure 11 further comprises a second actuation mechanism 121 for actuating the second door 61 for movement between the closed position and the inlet position. The second actuation mechanism 121 extends through the duct structure 105, so that a part of the second actuation mechanism 121 is arranged inside the duct 53 and another part of the second actuation mechanism 121 is arranged outside the duct 53.

The second actuation mechanism 121 comprises a second actuator 74, a second lever 83 in the form of a torque arm, and a second shaft 123. The second shaft 123 is aligned with and rotatable about the second hinge axis 65, and is fixedly mounted to the second door 61. Further, the second lever 83 is mounted to the second shaft 123 in a torque proof manner. The second actuator 74 is formed as a linear actuator configured to adjust the distance between its first and second ends 76, 78. The second actuator 74 is pivotably mounted with its first end 76 to the second lever 83 via a fifth hinge 91. Further, the second actuator 74 is configured for being pivotably mounted with its second end 78 to the front spar 32 via a sixth hinge 93.

The second shaft 123 is arranged in a manner that it penetrates the duct structure 105, so that the portion of the second shaft 123 that is mounted to the second door 61 is arranged inside the duct 53, while the portion of the second shaft 123 that is mounted to the second lever 83 is arranged outside the duct 53. A second shaft fitting 125 is provided in the duct structure 105, receiving the second shaft 123 and sealing the duct structure 105 relative to the second shaft 123 where the second shaft 123 penetrates the duct structure 105.

The second shaft 123 is rotatably mounted to the leading edge panel 13 via the second hinge 63. The second hinge 63 is formed by several hinge brackets 119 fixedly mounted to the leading edge panel 13 and rotatably supporting the second shaft 123. The second hinge 63 is arranged inside the duct 53 in such a way that the hinge brackets 119 are mounted to the leading edge panel 13 inside the duct 53.

As shown in detail in FIG. 6, the duct structure 105 further has an indentation 126 to the inside of the duct 53 formed such that two wall sections 127a, 12713, of the duct structure 105 face towards one another. The second shaft 123 penetrates the duct structure 105 at both wall sections 127a, 127b, so that preferably only the portion of the second shaft 123 that is mounted to the second lever 83 is arranged outside the duct 53, while the rest of the second shaft 123 is arranged inside the duct 53. The second shaft fitting 125 has two fitting parts 125a, 12513, receiving the second shaft 123 and sealing the duct structure 105 relative to the second shaft 123 at the two opposite wall sections 127a, 12713, where the second shaft 123 penetrates the duct structure 105.

As visible in FIGS. 4 and 5, the first lever 81 is mounted to the first shaft 115 in the area of an upper, outbound side 129 of the first door 107. At the same time, the second lever 83 is mounted to the second shaft 123 in the area of a lower, inbound side 131 of the second door 109. The duct structure 105 is sandwiched by the first actuation mechanism in and the second actuation mechanism 121.

The invention claimed is:

1. A leading edge structure for a flow control system of an aircraft, the leading edge structure comprising
    a leading edge panel that surrounds a plenum in a curved manner, the plenum extending in a span direction,
    wherein the leading edge panel has a first side portion extending from a leading edge point to a first attachment end,
    wherein the leading edge panel has a second side portion opposite the first side portion, extending from the leading edge point to a second attachment end,
    wherein the leading edge panel comprises an inner surface facing the plenum and an outer surface in contact with an ambient flow, and
    wherein the leading edge panel comprises a plurality of micro pores forming a fluid connection between the plenum and the ambient flow,
    wherein a first port device is arranged in the first side portion of the leading edge panel,
    wherein the first port device is fluidly connected to the plenum via a duct defined by a duct structure,
    wherein the first port device comprises a first door pivotable by a first hinge about a first hinge axis between at least two positions of an outlet position, a closed position, and an inlet position,
    wherein the leading edge structure comprises a first actuation mechanism configured to actuate the first door for movement between the at least two positions of the outlet position, the closed position and the inlet position,
    wherein the first actuation mechanism extends through the duct structure, so that a first part of the first actuation mechanism is arranged inside the duct and a second part of the first actuation mechanism is arranged outside the duct,
    wherein the second part of the first actuation mechanism is attached via a hinge to a front spar of an aircraft component to which the leading edge structure is attached, and
    wherein the first door is linked via a lever to the first part of the first actuation mechanism and is forward of the front spar.

2. A leading edge structure for a flow control system of an aircraft, the leading edge structure comprising
    a leading edge panel that surrounds a plenum in a curved manner, the plenum extending in a span direction,
    wherein the leading edge panel has a first side portion extending from a leading edge point to a first attachment end,
    wherein the leading edge panel has a second side portion opposite the first side portion, extending from the leading edge point to a second attachment end,
    wherein the leading edge panel comprises an inner surface facing the plenum and an outer surface in contact with an ambient flow, and
    wherein the leading edge panel comprises a plurality of micro pores forming a fluid connection between the plenum and the ambient flow,
    wherein a first port device is arranged in the first side portion of the leading edge panel,
    wherein the first port device is fluidly connected to the plenum via a duct defined by a duct structure,
    wherein the first port device comprises a first door pivotable by a first hinge about a first hinge axis between at least two positions of an outlet position, a closed position, and an inlet position,
    wherein the leading edge structure comprises a first actuation mechanism configured to actuate the first door for movement between the at least two positions of the outlet position, the closed position and the inlet position,
    wherein the first actuation mechanism extends through the duct structure, so that a part of the first actuation mechanism is arranged inside the duct and another part of the first actuation mechanism is arranged outside the duct,
    wherein the first actuation mechanism comprises a first actuator, a first lever, and a first shaft,
    wherein the first shaft is aligned with and rotatable about the first hinge axis, and is fixedly mounted to the first door,
    wherein the first lever is mounted to the first shaft in a torque proof manner,
    wherein the first actuator is formed as a linear actuator configured to adjust the distance between a first end and a second end,
    wherein the first actuator is pivotably mounted with its first end to the first lever via a third hinge, and
    wherein the first actuator is configured for being pivotably mounted with its second end to a front spar via a fourth hinge.

3. The leading edge structure according to claim 2, wherein the first shaft is arranged to penetrate the duct structure, so that the portion of the first shaft mounted to the first door is arranged inside the duct, and the portion of the first shaft mounted to the first lever is arranged outside the duct.

4. The leading edge structure according to claim 3, wherein in the duct structure a first shaft fitting is configured to receive the first shaft and sealing the duct structure relative to the first shaft where the first shaft penetrates the duct structure.

5. The leading edge structure according to claim 2, wherein the first shaft is rotatably mounted to the leading edge panel via the first hinge, and wherein the first hinge is arranged inside the duct.

6. The leading edge structure according to claim 1, wherein a second port device is arranged in the second side portion of the leading edge panel, wherein the second port device is fluidly connected to the plenum via the duct, wherein the second port device comprises a second door pivotable by a second hinge about a second hinge axis between at least two positions of an outlet position, a closed position, and an inlet position.

7. The leading edge structure according to claim 6, wherein the leading edge structure comprises a second actuation mechanism for actuating the second door for movement between the at least two positions of the outlet position, the closed position and the inlet position, and wherein the second actuation mechanism extends through the duct structure, so that a part of the second actuation mechanism is arranged inside the duct and another part of the second actuation mechanism is arranged outside the duct.

8. The leading edge structure according to claim 7, wherein the second actuation mechanism comprises a second actuator, a second lever, and a second shaft, wherein the second shaft is aligned with and rotatable about the second hinge axis, and is fixedly mounted to the second door, wherein the second lever is mounted to the second shaft in a torque proof manner, wherein the second actuator is formed as a linear actuator configured to adjust the distance between its first and second ends, wherein the second actuator is pivotably mounted with a first end to the second lever via a fifth hinge, wherein the second actuator is configured for being pivotably mounted with its second end to the front spar via a sixth hinge, wherein the second shaft is arranged in a manner that it penetrates the duct structure, so that the portion of the second shaft that is mounted to the second door is arranged inside the duct, while the portion of the second shaft that is mounted to the second lever is arranged outside the duct, wherein in the duct structure a second shaft fitting is provided receiving the second shaft and sealing the duct structure relative to the second shaft where the second shaft penetrates the duct structure, wherein the second shaft is rotatably mounted to the leading edge panel via the second hinge, and wherein the second hinge is arranged inside the duct.

9. The leading edge structure according to claim 8, wherein the duct structure has an indentation to the inside of the duct, so that two wall sections of the duct structure face each other, wherein the second shaft penetrates the duct structure at both wall sections, so that only the portion of the second shaft mounted to the second lever is outside the duct and the rest of the second shaft is inside the duct.

10. The leading edge structure according to claim 8, wherein the first lever is mounted to the first shaft in the area of an outbound side of the first door, and/or wherein the second lever is mounted to the second shaft in an area of an inbound side of the second door.

11. The leading edge structure according to claim 6, wherein the first port device is formed as an air outlet so that the first door is movable by the first actuation mechanism between the closed position and the outlet position, and/or wherein the second port device is formed as an air inlet so that the second door is movable by the second actuation mechanism) between the closed position and the inlet position.

12. The leading edge structure according to any of claim 6, wherein the first hinge axis is at a leading edge of the first door, and/or wherein the second hinge axis is at a leading edge of the second door.

13. The leading edge structure according to claim 6, wherein the leading edge panel comprises a first panel part next to a second panel part in the span direction, wherein the first panel part includes the micro pores and a second panel part includes the first and second port devices, and wherein the first and second panel parts are formed as an integral, single part, or as two separate parts.

14. A vertical tail plane for an aircraft comprising a vertical tail plane box having a first lateral panel with a first attachment portion and an opposite second lateral panel with a second attachment portion, a leading edge structure according to claim 1, wherein the first attachment end is attached to the first attachment portion, and wherein the second attachment end is attached to the second attachment portion, so that the first side portion of the leading edge panel forms a continuous flow surface with the first lateral panel of the vertical tail plane box, and the second side portion of the leading edge panel forms a continuous flow surface with the second lateral panel of the vertical tail plane box.

15. An aircraft comprising the leading edge structure according to claim 1.

* * * * *